(12) United States Patent
Freeman

(10) Patent No.: US 8,028,794 B1
(45) Date of Patent: Oct. 4, 2011

(54) CASE FOR AN ELECTRONIC DEVICE

(75) Inventor: Falco Freeman, Portland, OR (US)

(73) Assignee: Futuristic Audio Design Innovations, LLC, Portland, OR (US)

( * ) Notice: Subject to any disclaimer, the term of this patent is extended or adjusted under 35 U.S.C. 154(b) by 0 days.

(21) Appl. No.: 12/765,729

(22) Filed: Apr. 22, 2010

(51) Int. Cl.
 *H02K 5/24* (2006.01)
(52) U.S. Cl. .................. 181/202; 455/575.1; 455/575.6; 455/575.8; 455/575.9
(58) Field of Classification Search ................. 181/202; 455/575.1, 575.6, 575.8, 575.9
See application file for complete search history.

(56) References Cited

U.S. PATENT DOCUMENTS

| | | | | |
|---|---|---|---|---|
| 4,936,530 | A | * | 6/1990 | Wollar .............................. 248/71 |
| D609,463 | S | * | 2/2010 | Bullen ........................... D3/218 |
| 2005/0181745 | A1 | * | 8/2005 | Wood et al. .................. 455/90.3 |
| 2005/0255895 | A1 | * | 11/2005 | Lee et al. ....................... 455/573 |
| 2009/0036174 | A1 | * | 2/2009 | Brandenburg et al. .... 455/575.1 |
| 2010/0059649 | A1 | * | 3/2010 | Buxton .......................... 248/371 |
| 2010/0124040 | A1 | * | 5/2010 | Diebel et al. .................. 361/816 |

* cited by examiner

*Primary Examiner* — Forrest M Phillips
(74) *Attorney, Agent, or Firm* — Marger Johnson & McCollom, P.C.

(57) ABSTRACT

A case for an electronic device can include two pieces. A first piece can be configured to be attached to the electronic device in a substantially fixed position. A second piece can be configured to be attached to the electronic device in one of multiple substantially fixed positions.

22 Claims, 9 Drawing Sheets

CASE FOR AN ELECTRONIC DEVICE

TECHNICAL FIELD

The disclosed technology pertains to electronic devices and, more particularly, to cases for electronic devices.

BACKGROUND

Electronic devices have advanced dramatically over the years. As such devices have become increasingly complex, they have also generally become smaller and, in many cases, more fragile. A wide assortment of electronic device cases have been designed over the years and many have provided at least some measure of protection for the corresponding electronic devices. For example, some cases have protected electronic devices from being damaged when experiencing drops or other physical shocks while other devices have included waterproof casings.

Regardless of the primary purpose of these electronic device cases, such cases have generally resulted in a decreased experience or performance of certain types of information that may emanate from the protected electronic device such as audio information, e.g., sounds, voice, and music. Current electronic device cases also tend to negatively impact certain types of information to be received by the electronic device such as audio information, e.g., sound or voice data to be received by a microphone component of the electronic device.

There remains a need for a way to address these and other problems associated with the prior art.

DETAILED DESCRIPTION

Figure 1A:
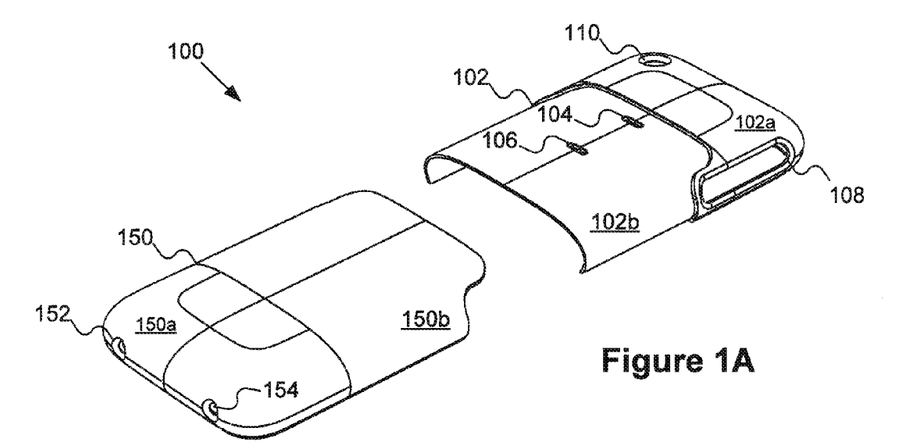
FIG. 1A illustrates a first view of a first position of a first example of an electronic device case in accordance with embodiments of the disclosed technology.

FIG. 1A illustrates a first view of a first position of a first example of an electronic device case 100. The electronic device case 100 may include two pieces: an upper piece 102 and a lower piece 150. In this first position of the first example, the upper piece 102 and the lower piece 150 are fully separated from each other. Also, neither the upper piece 102 nor the lower piece 150 are attached to an electronic device in the example. One having ordinary skill in the art will appreciate, however, that either or both of the upper piece 102 and the lower piece 150 may be attached to an electronic device such as a personal digital assistant (PDA), a portable media player, e.g., an Apple iTouch® or iPad®, or a personal or mobile communications device such as a wireless smart phone, e.g., an Apple iPhone®.

In certain embodiments, the electronic device case 100 may protect an electronic device from scratches or shocks.

The electronic device case 100 may also provide a greater gripping capability for a user. Alternatively or in addition, the electronic device case may enhance the audio performance of an audio input component, e.g., a microphone, of the electronic device or an audio output component, e.g., a speaker, of the electronic device.

While the terms "upper" and "lower" may be used herein to more conveniently describe the corresponding pieces 102 and 150, one having ordinary skill in the art will appreciate that these terms are not meant to be limiting; rather, the terms "upper" and "lower" may be used to emphasize that, in embodiments where the electronic device case 100 is fully attached to an electronic device, for example, each piece may be attached to a different portion of the electronic device, e.g., to an "upper" portion and to a "lower" portion of the electronic device.

In the first example, the upper piece 102 of the electronic device case 100 includes two portions: an upper portion 102a and a lower portion 102b. In certain embodiments, the upper piece 102 may be configured to be attached to an electronic device in a substantially fixed position. The lower piece 150 may also be configured to be attached to the electronic device but, unlike the upper piece 102, the lower piece 150 may have two or more distinct substantially fixed positions. When the lower piece 150 is in a first substantially fixed position, for example, a top edge of the lower piece 150 may be in close proximity to a bottom edge of the upper piece 102. When the lower piece 150 is in a second substantially fixed position, the lower piece 150 may be configured to define a gap between a bottom edge of the lower piece 150 and a bottom edge of the electronic device. These implementations are described in detail below, particularly with reference to FIGS. 7-9.

In certain embodiments, the lower portion 102b may be slightly smaller than the upper portion 102a in terms of one or both of outer height and outer width. The thickness of the lower portion 102b may also be smaller than the thickness of the upper portion 102a. The lower portion 102b may have any of a number of shapes and sizes. In certain embodiments, the lower portion 102b may consist of multiple sub-portions. The illustrated examples described herein are representatives of only of few of the many possible arrangements for the disclosed technology.

In certain embodiments, the upper portion 102a may define a side opening 108 to provide a user with access to one or more buttons or switches on the side of an electronic device when the upper piece 102 is attached to the electronic device. Alternatively or in addition, the upper piece 102 may define a camera lens opening 110 to provide a camera lens of an electronic device with external access when the upper piece 102 is attached to the electronic device. While the camera lens opening 110 in the example is circular, one having ordinary skill in the art will appreciate that the camera lens opening 100 may have any of a number of different sizes, shapes, and placements within the lower piece 150 in other embodiments.

The upper piece 102 may have one or more attaching features configure to allow the lower piece 150 to attach to the upper piece 102. In the example, the lower portion 102b of the upper piece 102 defines two openings 104 and 106, e.g., holes, slits, or notches, that are each designed to receive a corresponding attaching feature of the lower piece 150, such as the protruding portion 156 discussed below with reference to FIG. 2A. While the two openings 104 and 106 in the example are mostly rectangular with rounded corners, one having ordinary skill in the art will appreciate that either of the two openings 104 and 106 may have any of a number of different sizes, shapes, and placements within the lower piece 150 in other embodiments.

The lower piece 150 may define one or more openings to facilitate the passage of audio information, e.g., sound. In the example, the lower portion 150a of the lower piece 150 defines two openings 152 and 154. In certain embodiments, one of the openings 152 and 154 may be positioned to facilitate the passage of audio information from a speaker feature or other output component of an electronic device when the lower piece 150 is attached to the electronic device. Alternatively or in addition, the other one of the openings 152 and 154 may be positioned to facilitate the passage of audio information to a microphone feature or other input component of the electronic device when the lower piece 150 is attached to the electronic device. While the two openings 152 and 154 in the example are circular, one having ordinary skill in the art will appreciate that either of the two openings 152 and 154 may have any of a number of different sizes, shapes, and placements within the lower piece 150 in other embodiments.

Figure 1B:
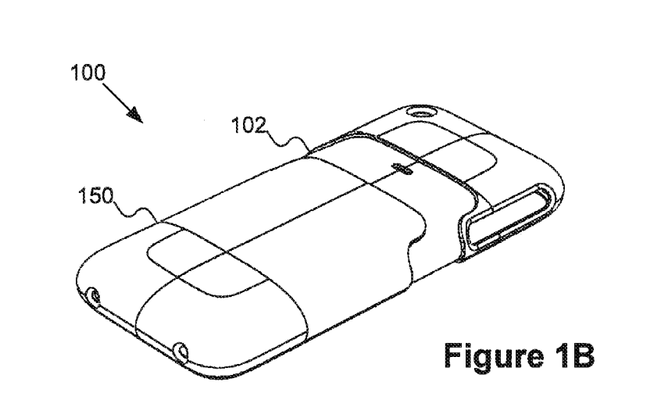
FIG. 1B illustrates a first view of a second position of the first example of an electronic device case in accordance with embodiments of the disclosed technology.

FIG. 1B illustrates a first view of a second position of the first example of the electronic device case 100. In this second position of the electronic device case 100, the upper piece 102 and the lower piece 150 may be partially attached to each other. For example, the electronic device case 100 may be attached to an electronic device such that a gap is formed between the lower piece 150 and the electronic device, as discussed in detail below with reference to FIGS. 7B, 8B, and 9B. This formed gap may enhance the transmission of audio information, e.g., sound, both to and from the electronic device, for example.

Figure 1C:
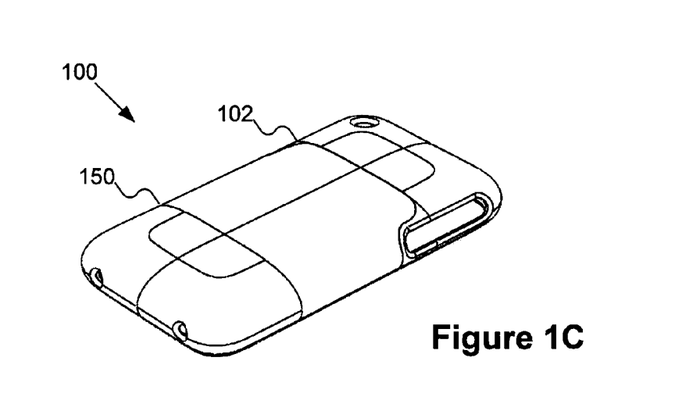
FIG. 1C illustrates a first view of a third position of the first example of an electronic device case in accordance with embodiments of the disclosed technology.

FIG. 1C illustrates a first view of a third position of the first example of the electronic device case 100. In this third position of the electronic device case 100, the upper piece 102 and the lower piece 150 may be fully attached to each other. For example, the electronic device case 100 may be attached to an electronic device such that no gap is formed between the lower piece 150 and the electronic device, as discussed below with reference to FIGS. 7C, 8C, and 9C.

Figure 2A:
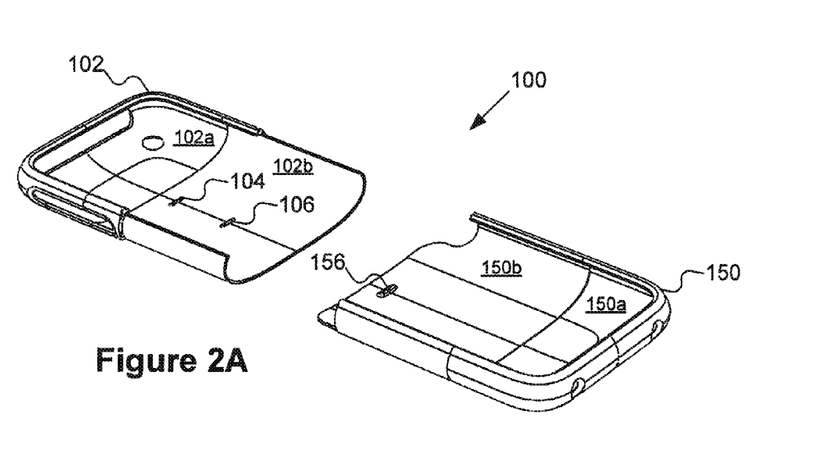
FIG. 2A illustrates a second view of the first position of the first example of an electronic device case as illustrated in FIG. 1A.

FIG. 2A illustrates a second view of the first position of the first example of the electronic device case 100 as illustrated in FIG. 1A. As discussed above, the upper piece 102 and the lower piece 150 may each have attaching features that allow the two pieces 102 and 150 to attach to each other. In this second view of the first position, one can see a protruding portion 156 of the upper portion 150b of the lower piece 150 that is suitable for mating with either of the openings 104 and 106 of the lower portion 102b of the upper piece 102.

Figure 2B:
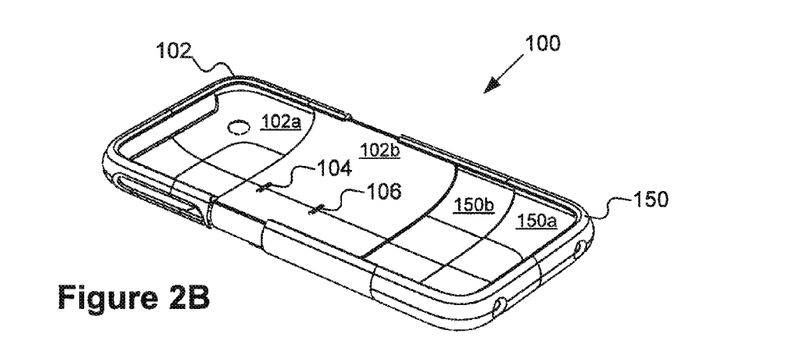
FIG. 2B illustrates a second view of the second position of the first example of an electronic device case as illustrated in FIG. 1B.

FIG. 2B illustrates a second view of the second position of the first example of the electronic device case 100 as illustrated in FIG. 1B. In this second view, one having ordinary skill in the art will appreciate that the second position of the electronic device case 100 may be obtained and maintained by a coupling of the lower opening 106 of the lower portion 102b of the upper piece 102 and the protruding portion 156 of the upper portion 150b of the lower piece 150. In certain embodiments, a user may slide the lower piece 150 over the upper piece 102 until the protruding portion 156 of the lower piece 150 attaches with, e.g., locks or snaps into, the lower opening 106 of the upper piece 102.

Figure 2C:
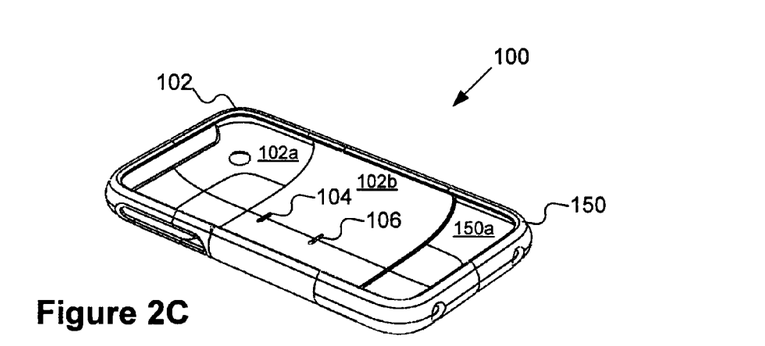
FIG. 2C illustrates a second view of the third position of the first example of an electronic device case as illustrated in FIG. 1C.

FIG. 2C illustrates a second view of the third position of the first example of the electronic device case 100 as illustrated in FIG. 1C. In this second view, one having ordinary skill in the art will appreciate that the third position of the electronic device case 100 may be obtained and maintained by a coupling of the upper opening 104 of the lower portion 102b of the upper piece 102 and the protruding portion 156 of the upper portion 150b of the lower piece 150. In certain embodiments, a user may slide the lower piece 150 over the upper piece 102 until the protruding portion 156 of the lower piece 150 attaches with, e.g., locks or snaps into, the upper opening 104 of the upper piece 102.

While the illustrated example includes a protruding portion 156 of the lower piece 150 and two openings 104 and 106 in the upper piece 102, one having ordinary skill in the art will recognize that there are many possible variations in the techniques that may be used to allow the two pieces 102 and 150 to attach to each other. For example, the lower piece 150 may have an opening in place of the protruding portion 156 and the upper piece 102 may have two protruding members in place of the openings 104 and 106. These embodiments may be structured such that the upper piece 102 is configured to slide over the lower piece 150, for example.

Alternative embodiments may not have any readily apparent attaching features such as the openings 104 and 106 of the upper piece and the protruding portion 156 of the lower piece 150; rather, such embodiments may rely on friction between the upper piece 102 and the lower piece 150 to allow the two pieces 102 and 150 to be attached to each other. Such friction may result from application of a spray to one or both of an outer surface of the upper piece 102 and an inner surface of the lower piece 150, for example. Other embodiments may implement attaching features or aspects between each of the pieces 102 and 150 and an electronic device rather than between each other.

Figure 3A:
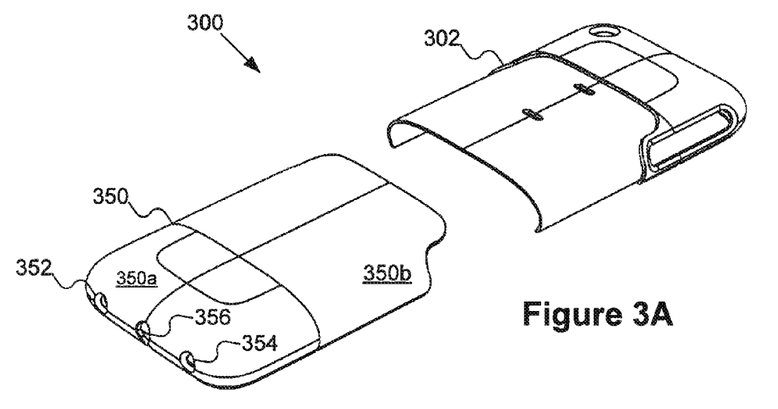
FIG. 3A illustrates a first view of a first position of a second example of an electronic device case in accordance with embodiments of the disclosed technology.

FIG. 3A illustrates a first view of a first position of a second example of an electronic device case 300 in accordance with embodiments of the disclosed technology. In the example, the electronic device case 300 has an upper piece 302 and a lower piece 350 and is similar to the electronic device case 100 illustrated in FIGS. 1 and 2. For example, the lower piece 350 of the electronic device case 300 may have two openings 352 and 354 that are positioned to facilitate the passage of audio information from an audio output component, e.g., speaker, of the electronic device and to an input component, e.g., microphone, of the electronic device when the lower piece 350 is attached to the electronic device.

In the example, the lower piece 350 of the electronic device case 300 has an additional opening or hole 356 that may be used to allow a cable or wire to pass through the lower piece 350. For example, a connector or plug that may interface with a port located at a bottom portion of an electronic device may have a wire or cable attached thereto. When the connector or plug is attached to the electronic device, the additional opening 356 may keep the corresponding cable or wire in place. In some embodiments, the additional opening 356 may be a keyhole configured to keep the wire or cable secure in its positioning.

Figure 3B:
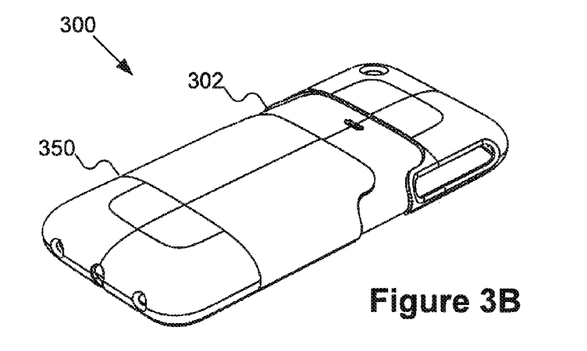
FIG. 3B illustrates a first view of a second position of the second example of an electronic device case in accordance with embodiments of the disclosed technology.

FIG. 3B illustrates a first view of a second position of the second example of the electronic device case 300. In this position, the upper piece 302 and the lower piece 350 are at least partially attached to each other.

Figure 3C:
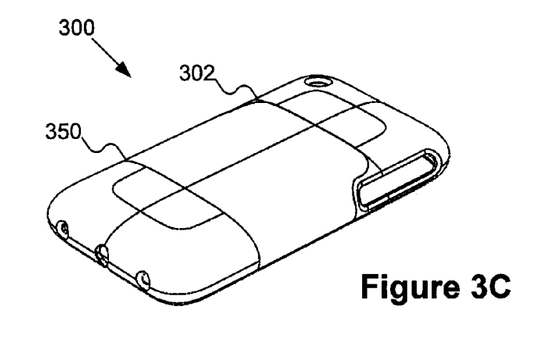
FIG. 3C illustrates a first view of a third position of the second example of an electronic device case in accordance with embodiments of the disclosed technology.

FIG. 3C illustrates a first view of a third position of the second example of the electronic device case 300. In this position, the upper piece 302 and the lower piece 350 are fully attached to each other.

Figure 4A:
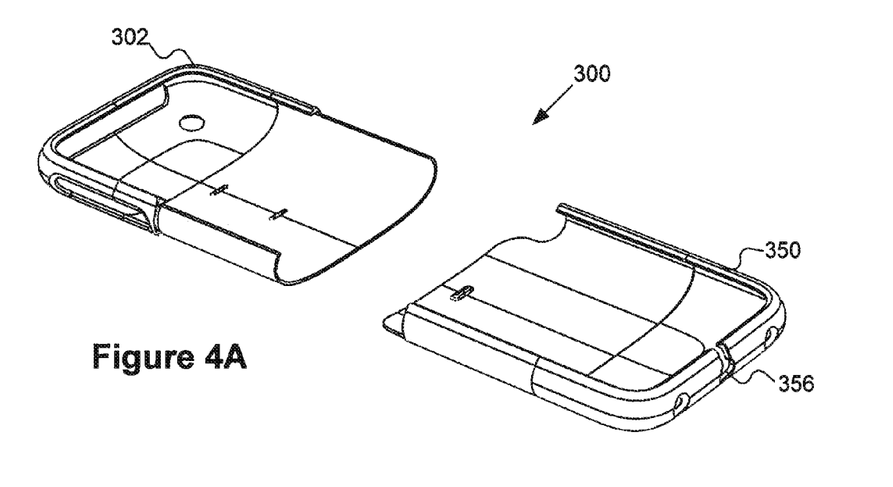
FIG. 4A illustrates a second view of the first position of the second example of an electronic device case as illustrated in FIG. 1A.

FIG. 4A illustrates a second view of the first position of the second example the an electronic device case 300 as illustrated in FIG. 3A. The arrangement between the upper piece 302 and the lower piece 350 as illustrated in FIG. 4A is similar to the arrangement between the upper piece 102 and the lower piece 150 as illustrated in FIG. 2A, with the exception of the additional opening 356 in the lower piece 350 of the electronic device case 300.

Figure 4B:
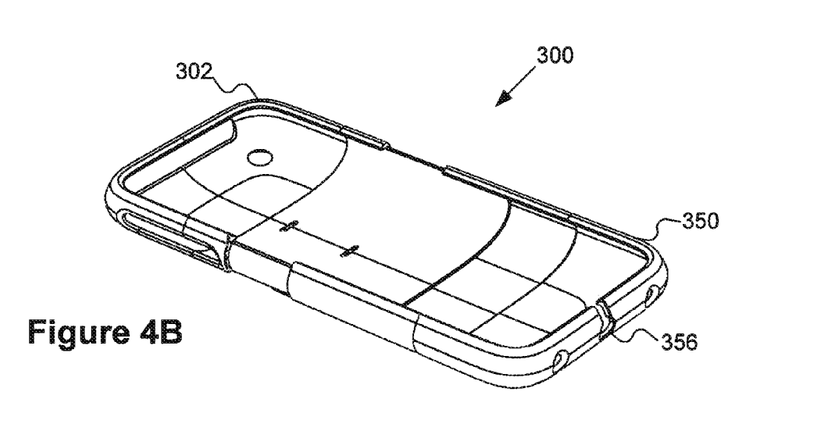
FIG. 4B illustrates a second view of the second position of the second example of an electronic device case as illustrated in FIG. 1B.

FIG. 4B illustrates a second view of the second position of the second example of the electronic device case 300 as illustrated in FIG. 3B. The arrangement between the upper piece 302 and the lower piece 350 as illustrated in FIG. 4B is similar to the arrangement between the upper piece 102 and the lower piece 150 as illustrated in FIG. 2B, with the exception of the additional opening 356 in the lower piece 350 of the electronic device case 300.

Figure 4C:
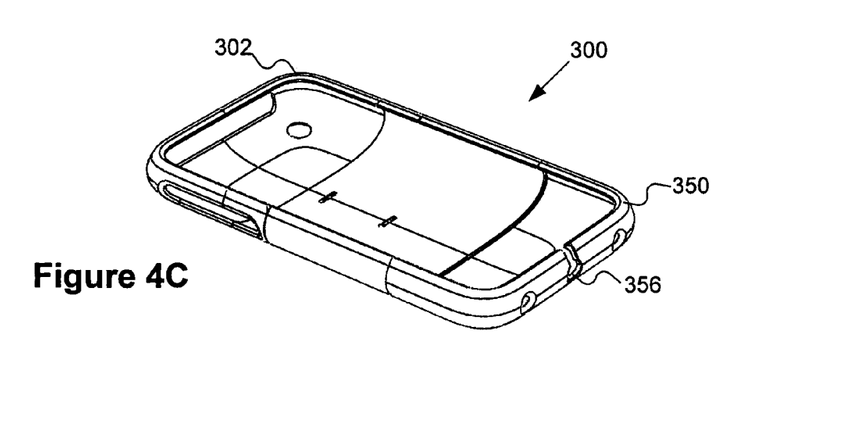
FIG. 4C illustrates a second view of the third position of the second example of an electronic device case as illustrated in FIG. 1C.

FIG. 4C illustrates a second view of the third position of the second example of the electronic device case 300 as illustrated in FIG. 3C. The arrangement between the upper piece 302 and the lower piece 350 as illustrated in FIG. 4C is similar to the arrangement between the upper piece 102 and the lower piece 150 as illustrated in FIG. 2C, with the exception of the additional opening 356 in the lower piece 350 of the electronic device case 300.

Figure 5A:
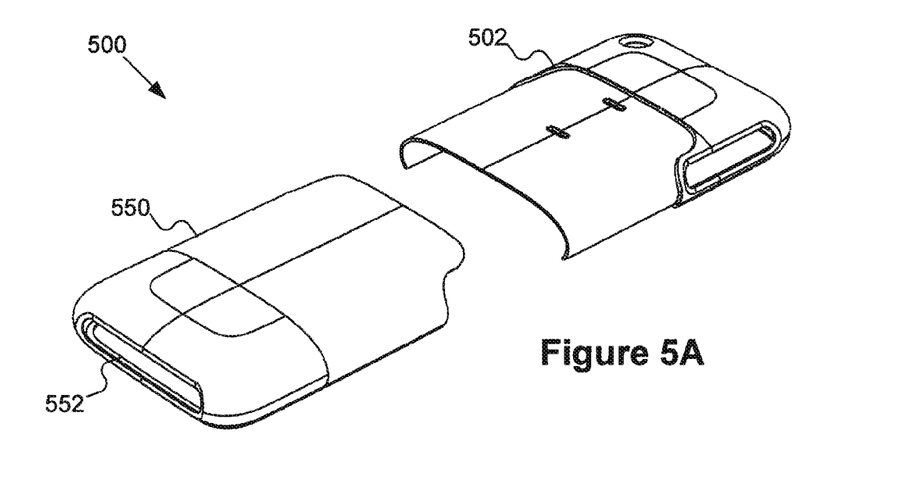
FIG. 5A illustrates a first view of a first position of a third example of an electronic device case in accordance with embodiments of the disclosed technology.

FIG. 5A illustrates a first view of a first position of a third example of an electronic device case 500. In the example, the electronic device case 500 has an upper piece 502 and a lower piece 550 and is similar to the electronic device cases 100 and 300 illustrated in FIGS. 1-2 and 3-4, respectively. The electronic device case 500 in this third example, however, has a single opening 552 in a lower piece 550 instead of multiple smaller openings.

Figure 5B:
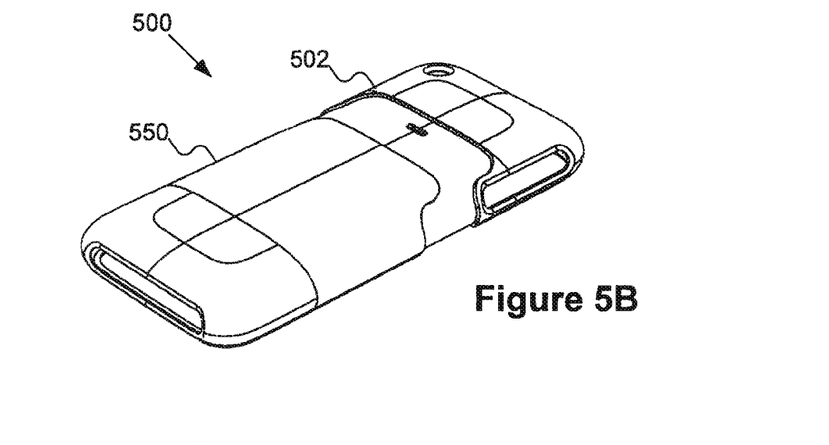
FIG. 5B illustrates a first view of a second position of the third example of an electronic device case in accordance with embodiments of the disclosed technology.

FIG. 5B illustrates a first view of a second position of the third example of the electronic device case 500. The arrangement between the upper piece 502 and the lower piece 550 as illustrated in FIG. 5B is similar to the arrangement between the upper piece 102 and the lower piece 150 as illustrated in FIG. 2B and the arrangement between the upper piece 302 and the lower piece 350 as illustrated in FIG. 4B, with the exception of the single opening 552 in the lower piece 550 instead of multiple smaller openings.

Figure 5C:
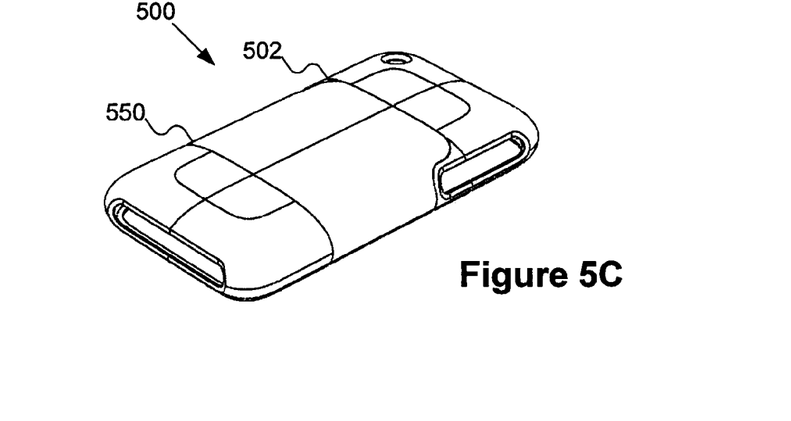
FIG. 5C illustrates a first view of a third position of the third example of an electronic device case in accordance with embodiments of the disclosed technology.

FIG. 5C illustrates a first view of a third position of the third example of the electronic device case 500. The arrangement between the upper piece 502 and the lower piece 550 as illustrated in FIG. 5C is similar to the arrangement between the upper piece 102 and the lower piece 150 as illustrated in FIG. 2C and the arrangement between the upper piece 302 and the lower piece 350 as illustrated in FIG. 4C, with the exception of the single opening 552 in the lower piece 550 instead of multiple smaller openings.

Figure 6A:
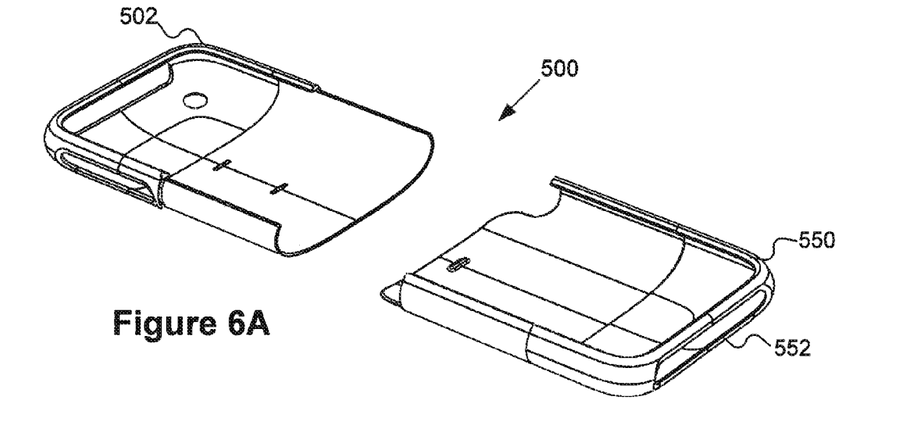
FIG. 6A illustrates a second view of the first position of the third example of an electronic device case as illustrated in FIG. 1A.

FIG. 6A illustrates a second view of the first position of the third example of the electronic device case 500 as illustrated in FIG. 5A. The arrangement between the upper piece 502 and the lower piece 550 as illustrated in FIG. 6A is similar to the arrangement between the upper piece 102 and the lower piece 150 as illustrated in FIG. 2A and the arrangement between the upper piece 302 and the lower piece 350 as illustrated in FIG. 4A, with the exception of the single opening 552 in the lower piece 550 in place of multiple smaller openings.

Figure 6B:
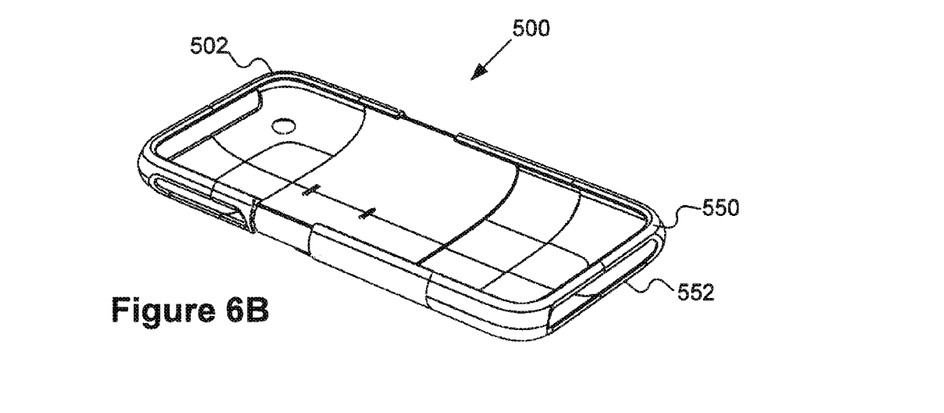
FIG. 6B illustrates a second view of the second position of the third example of an electronic device case as illustrated in FIG. 1B.

FIG. 6B illustrates a second view of the second position of the third example of the electronic device case 500 as illustrated in FIG. 5B. The arrangement between the upper piece 502 and the lower piece 550 as illustrated in FIG. 6B is similar to the arrangement between the upper piece 102 and the lower piece 150 as illustrated in FIG. 2B and the arrangement between the upper piece 302 and the lower piece 350 as illustrated in FIG. 4B, with the exception of the single opening 552 in the lower piece 550 in place of multiple smaller openings.

Figure 6C:
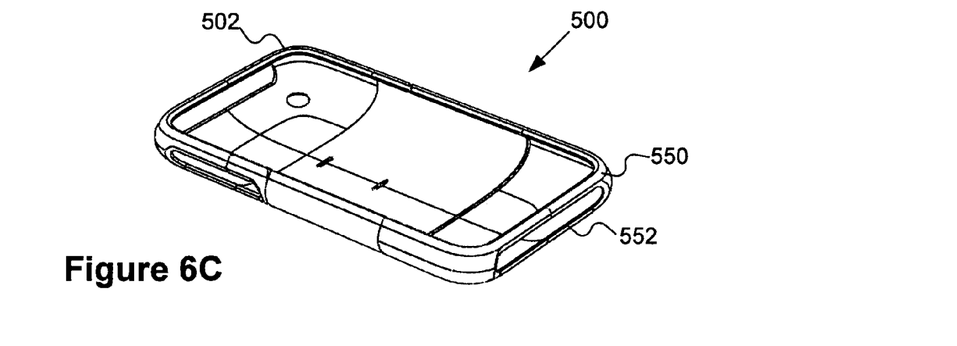
FIG. 6C illustrates a second view of the third position of the third example of an electronic device case as illustrated in FIG. 1C.

FIG. 6C illustrates a second view of the third position of the third example of the electronic device case 500 as illustrated in FIG. 5C. The arrangement between the upper piece 502 and the lower piece 550 as illustrated in FIG. 6C is similar to the arrangement between the upper piece 102 and the lower piece 150 as illustrated in FIG. 2C and the arrangement between the upper piece 302 and the lower piece 350 as illustrated in FIG.

4C, with the exception of the single opening 552 in the lower piece 550 in place of multiple smaller openings.

Figure 7A:
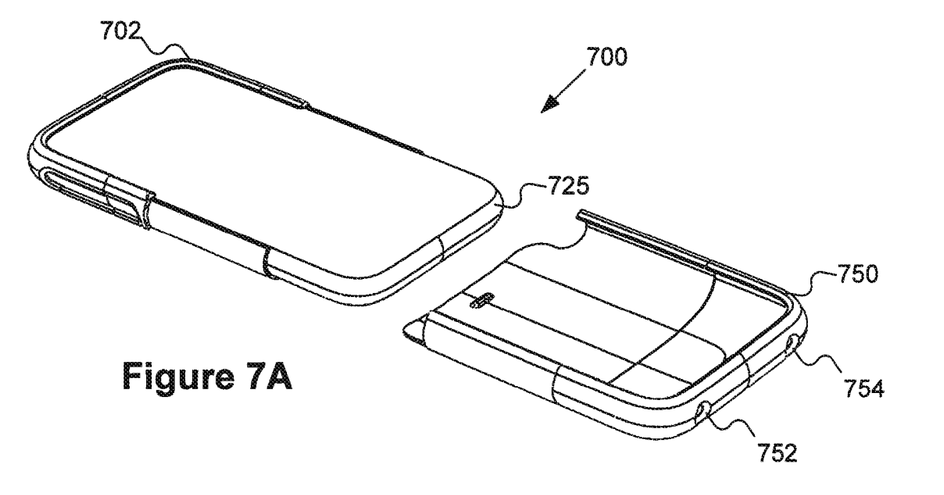
FIG. 7A illustrates a first position of a fourth example of an electronic device case in accordance with embodiments of the disclosed technology.

FIG. 7A illustrates a first position of a fourth example of an electronic device case 700. In the example, the electronic device case 700 has an upper piece 702 and a lower piece 750 and is substantially similar to the electronic device case 100 illustrated in FIGS. 1 and 2. In the present example, however, the upper piece 702 is attached to an electronic device 725. In certain embodiments, a user may slide the upper piece 702 of the electronic device case 700 over the electronic device 725 until it is secured in place by friction or any of a number of attachment mechanisms.

Figure 7B:
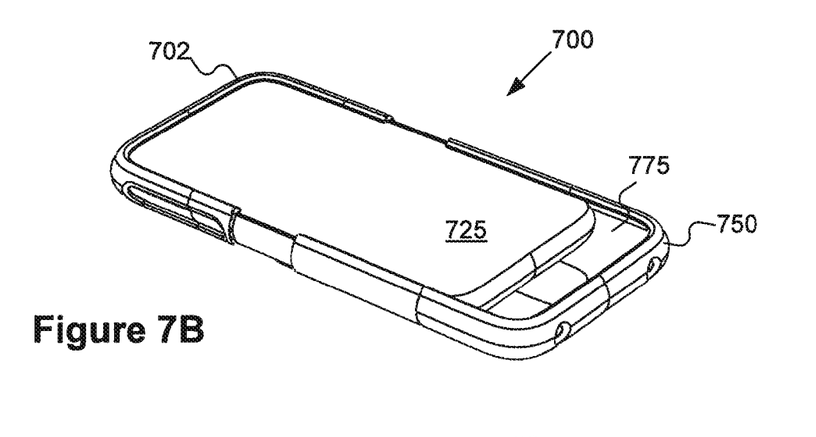
FIG. 7B illustrates a second position of the fourth example of an electronic device case in accordance with embodiments of the disclosed technology.

FIG. 7B illustrates a second position of the fourth example of the electronic device case 700. In the example, the lower piece 750 of the electronic device case 700 is attached or secured to one or both of the electronic device 725 and the upper piece 702 of the electronic device case 700 such that the lower piece 750 is placed in a first substantially fixed position. For example, a user may slide the lower piece 750 of the electronic device case 700 along the electronic device 725 until one or more attachment mechanisms, e.g., the lower opening 106 of the upper piece 102 and the protruding portion 156 of the lower piece of the electronic device case 100 illustrated in FIG. 2A, secures the lower piece 750 in the first substantially fixed position. In the example, the lower piece 750 of the electronic device case 700 substantially covers a majority portion of a backside of the electronic device 725 while in the first substantially fixed position.

In the example, a gap 775 is created between a lower edge of the lower piece 750 and a bottom edge of the electronic device 725. The gap 775 may be configured to collect audio information, e.g., sound waves, emanating from an audio output component, e.g., speaker, of the electronic device 725 and redirect the collected sound waves to a user of the electronic device, for example. Alternatively, the gap 775 may be configured to collect and refine audio information such as sound waves to be received by an audio input component, e.g., microphone, of the electronic device 725.

In certain embodiments, the gap 775 may be configured to amplify the sound waves that are collected from the electronic device 725 and redirected to the user. For example, the gap 775 may allow the volume of sound produced by the electronic device 725, as perceived by a user, to be increased by twenty percent or more, e.g., within a range of twenty-two to twenty-six percent.

In certain embodiments, a user may experience a perceived increase in audio information, e.g., sound, produced by the electronic device 725 from 60 decibels, e.g., when the electronic device case 700 is completely removed from the electronic device 725 or when only the upper piece 702 of the electronic device case 700 is attached to the electronic device 700 as illustrated in FIG. 7A, to 70 decibels or more, e.g., when the lower piece 750 of the electronic device case 700 is attached to the electronic device 700 as illustrated in FIG. 7B.

Figure 7C:
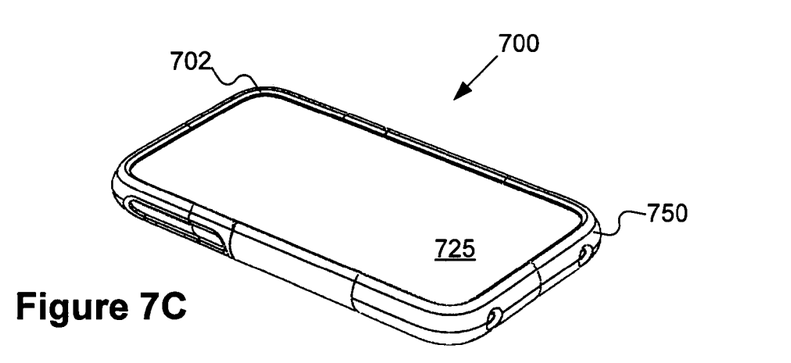
FIG. 7C illustrates a third position of the fourth example of an electronic device case in accordance with embodiments of the disclosed technology.

FIG. 7C illustrates a third position of the fourth example of the electronic device case 700. In the example, the lower piece 750 is in a second substantially fixed position. For example, a user may slide the lower piece 750 of the electronic device case 700 along the electronic device 725 until one or more attachment mechanisms, e.g., the upper opening 104 of the upper piece 102 and the protruding portion 156 of the lower piece of the electronic device case 100 illustrated in FIG. 2A, secures the lower piece 750 in the second substantially fixed position. In the example, the second substantially fixed position of the lower piece 750 substantially or completely elimi-nates the gap 775 that was established by the first substantially fixed position of the lower piece 750 as illustrated in FIG. 7B.

Figure 8A:
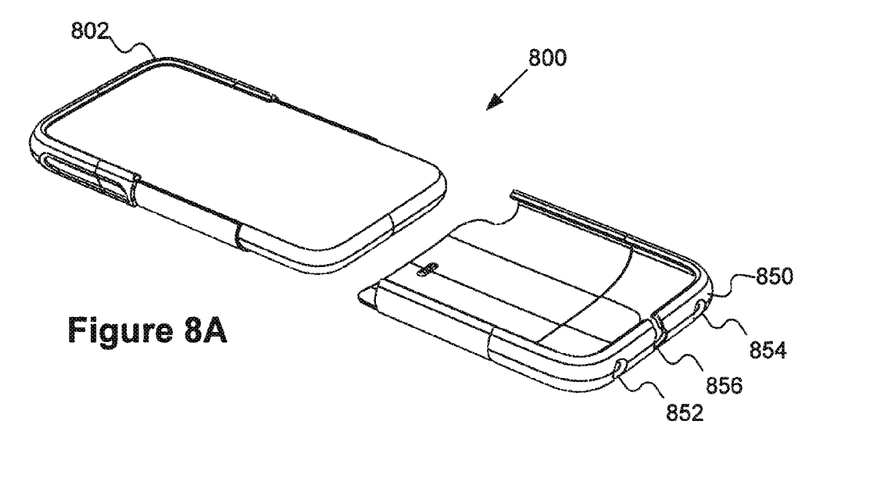
FIG. 8A illustrates a first position of a fifth example of an electronic device case in accordance with embodiments of the disclosed technology.

FIG. 8A illustrates a first position of a fifth example of an electronic device case 800. The arrangement between the upper piece 802 and the lower piece 850 as illustrated in FIG. 8A is substantially similar to the arrangement between the upper piece 702 and the lower piece 750 as illustrated in FIG. 7A, with the exception of the additional opening 856 in the lower piece 850.

Figure 8B:
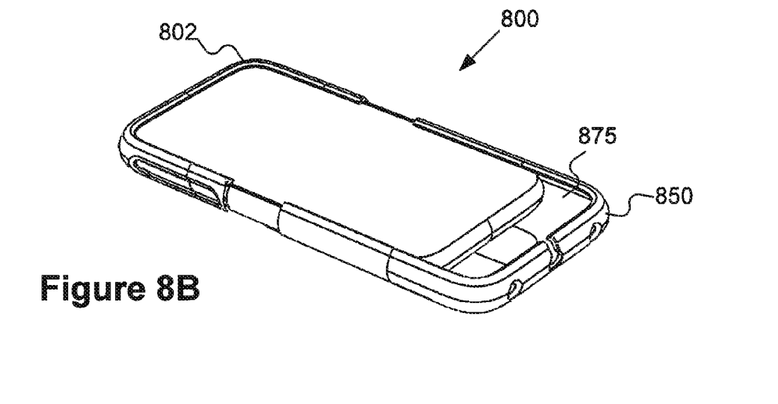
FIG. 8B illustrates a second position of the fifth example of an electronic device case in accordance with embodiments of the disclosed technology.

FIG. 8B illustrates a second position of the fifth example of the electronic device case 800. The arrangement between the upper piece 802 and the lower piece 850 as illustrated in FIG. 8B is substantially similar to the arrangement between the upper piece 702 and the lower piece 750 as illustrated in FIG. 7B, with the exception of the additional opening 856 in the lower piece 850.

Figure 8C:
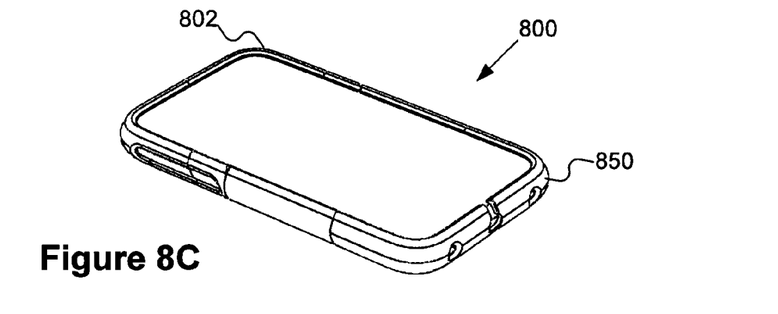
FIG. 8C illustrates a third position of the fifth example of an electronic device case in accordance with embodiments of the disclosed technology.

FIG. 8C illustrates a third position of the fifth example of the electronic device case 800. The arrangement between the upper piece 802 and the lower piece 850 as illustrated in FIG. 8C is substantially similar to the arrangement between the upper piece 702 and the lower piece 750 as illustrated in FIG. 7C, with the exception of the additional opening 856 in the lower piece 850.

Figure 9A:
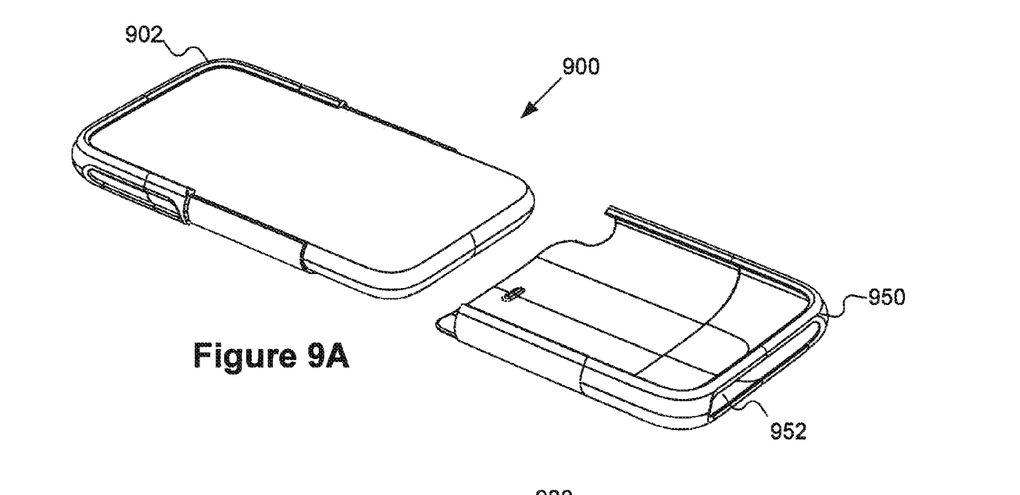
FIG. 9A illustrates a first position of a sixth example of an electronic device case in accordance with embodiments of the disclosed technology.

FIG. 9A illustrates a first position of a sixth example of an electronic device case 900. The arrangement between the upper piece 902 and the lower piece 950 as illustrated in FIG. 9A is substantially similar to the arrangement between the upper piece 702 and the lower piece 750 as illustrated in FIG. 7A and the arrangement between the upper piece 802 and the lower piece 850 as illustrated in FIG. 8A, with the exception of the single opening 952 in the lower piece 950 instead of multiple smaller openings.

Figure 9B:
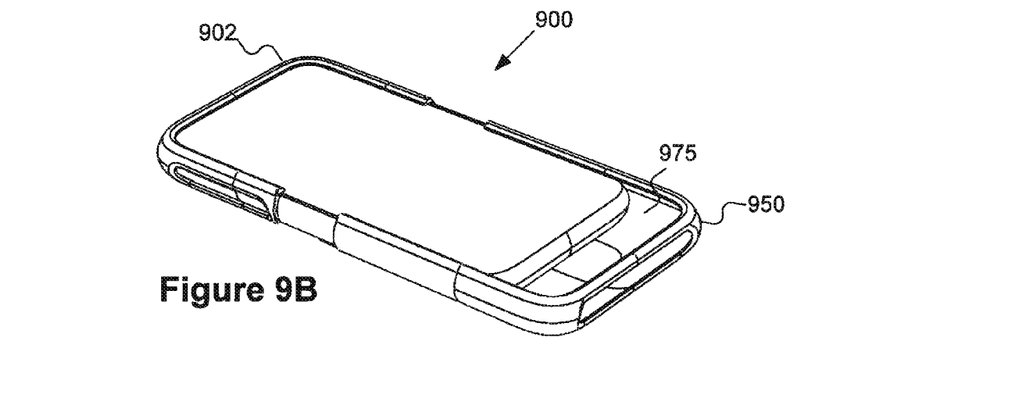
FIG. 9B illustrates a second position of the sixth example of an electronic device case in accordance with embodiments of the disclosed technology.

FIG. 9B illustrates a second position of the sixth example of the electronic device case 900. The arrangement between the upper piece 902 and the lower piece 950 as illustrated in FIG. 9B is substantially similar to the arrangement between the upper piece 702 and the lower piece 750 as illustrated in FIG. 7B and the arrangement between the upper piece 802 and the lower piece 850 as illustrated in FIG. 8B, with the exception of the single opening 952 in the lower piece 950 instead of multiple smaller openings.

Figure 9C:
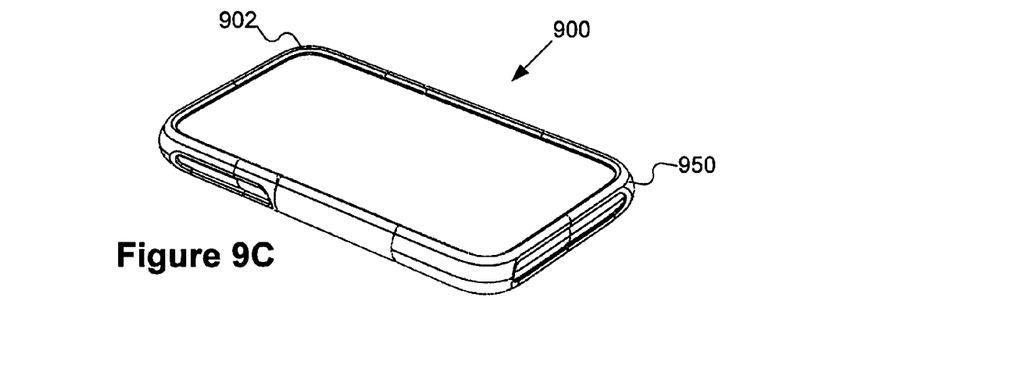
FIG. 9C illustrates a third position of the sixth example of an electronic device case in accordance with embodiments of the disclosed technology.

FIG. 9C illustrates a third position of the sixth example of the electronic device case 900. The arrangement between the upper piece 902 and the lower piece 950 as illustrated in FIG. 9C is substantially similar to the arrangement between the upper piece 702 and the lower piece 750 as illustrated in FIG. 7C and the arrangement between the upper piece 802 and the lower piece 850 as illustrated in FIG. 8C, with the exception of the single opening 952 in the lower piece 950 instead of multiple smaller openings.

In certain embodiments, some or all of the electronic device case pieces may be made of any of a number of different resin types. In certain embodiments, some or all of the electronic device case pieces may be made of polycarbonate (PC), acrylonitrile butadiene styrene (ABS), or a PC-ABS blend. Alternatively or in addition, some or all of the electronic device case pieces may be made of recycled material.

In certain materials, a spray may be applied to provide friction for frictional coupling of an upper piece to a lower piece, for example. In these embodiments, there may not be discrete positions; rather, either or both of the upper piece and the lower piece may be positioned in any of a virtually unlimited number of positions.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention.

What is claimed as the invention, therefore, is all such modifications as may come within the scope and spirit of the following claims and equivalents thereto.

The invention claimed is:

1. A case for an electronic device having a housing, comprising:
 a first piece configured to be attached to the housing of the electronic device in a substantially fixed position; and
 a second piece configured to be attached to the housing of the electronic device, the second piece having a first substantially fixed position and a second substantially fixed position that is translationally spaced from the first substantially fixed position by a predefined distance, wherein an upper edge of the second piece is in close proximity to a lower edge of the first piece when the second piece is in the first substantially fixed position, and wherein the second piece is configured to define a gap between a lower edge of the second piece and a bottom edge of the housing of the electronic device when the second piece is in the second substantially fixed position.

2. The case of claim 1, wherein the second piece substantially covers a majority portion of a backside of the electronic device when the second piece is in the first substantially fixed position.

3. The case of claim 1, further comprising at least one connecting portion configured to connect the second piece to the first piece in at least the first substantially fixed position.

4. The case of claim 3, wherein the at least one connecting portion is configured to connect the second piece to the first piece in the second substantially fixed position.

5. The case of claim 3, wherein the at least one connecting portion comprises an inner portion of the second piece having a top edge that extends beyond the top edge of the second piece.

6. The case of claim 3, wherein the at least one connecting portion comprises multiple units situated underneath each of the first piece and the second piece.

7. The case of claim 1, wherein the second piece is further configured to slide along the electronic device when transitioning between the first substantially fixed position and the second substantially fixed position.

8. The case of claim 7, further comprising a locking mechanism configured to secure the second piece into place in at least one of the first substantially fixed position and the second substantially fixed position.

9. The case of claim 8, wherein the locking mechanism comprises at least one protruding portion.

10. The case of claim 9, wherein the locking mechanism further comprises at least one receiving portion configured to receive the at least one protruding portion.

11. The case of claim 1, wherein the bottom portion of the second piece is configured to collect sound waves from the electronic device and redirect the sound waves to a user of the electronic device.

12. The case of claim 11, wherein the bottom portion of the second piece is further configured to amplify the collected and redirected sound waves.

13. The case of claim 12, wherein the collected and redirected sound waves are amplified by at least twenty percent.

14. The case of claim 1, wherein the bottom portion of the second piece defines at least one opening.

15. The case of claim 14, wherein the at least one opening is situated in close proximity to an audio component of the electronic device when the second piece is in the first substantially fixed position.

16. The case of claim 15, wherein the audio component comprises at least one of a speaker and a microphone.

17. The case of claim 14, wherein the at least one opening is configured to substantially keep a connecting wire in place.

18. The case of claim 1, wherein the body portion of the second piece comprises a polycarbonate (PC) acrylonitrile butadiene styrene (ABS) blend.

19. The case of claim 18, wherein the bottom portion of the second piece comprises the PC ABS blend.

20. The case of claim 1, wherein the first piece defines an opening configured to be in close proximity to a camera lens of the electronic device.

21. The case of claim 1, wherein the electronic device comprises a mobile communication device.

22. The case of claim 1, wherein the second piece comprises:
 a body portion in substantial alignment with a first plane; and
a bottom portion having two sub-portions, wherein each sub-portion is in substantial alignment with a corresponding plane, and wherein the plane corresponding to each of the sub-portions is substantially perpendicular to the first plane.

* * * * *